(12) United States Patent
Jackson et al.

(10) Patent No.: US 11,917,108 B1
(45) Date of Patent: *Feb. 27, 2024

(54) USER INTERFACES FOR AUTOMATED CONTROL AND ACCESS TO DISPARATE DATA/MANAGEMENT SYSTEMS

(71) Applicant: 8×8, Inc., Campbell, CA (US)

(72) Inventors: Harold Jackson, Campbell, CA (US); Bala Karuppanchettiyar, Campbell, CA (US); Nick Holland, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 17/544,212

(22) Filed: Dec. 7, 2021

Related U.S. Application Data

(63) Continuation of application No. 16/284,753, filed on Feb. 25, 2019, now Pat. No. 11,196,871.

(60) Provisional application No. 62/634,538, filed on Feb. 23, 2018.

(51) Int. Cl.
| | |
|---|---|
| *H04M 7/00* | (2006.01) |
| *H04L 29/08* | (2006.01) |
| *H04L 12/14* | (2006.01) |
| *H04L 41/5051* | (2022.01) |
| *H04L 67/75* | (2022.01) |

(52) U.S. Cl.
CPC ...... *H04M 7/0087* (2013.01); *H04L 12/1428* (2013.01); *H04L 41/5051* (2013.01); *H04L 67/75* (2022.05)

(58) Field of Classification Search
CPC . H04L 12/4604; H04L 41/5051; H04L 51/38; H04L 65/1069; H04L 61/1529; H04L 63/0407; H04L 67/36; H04L 67/75; H04M 7/00; H04M 7/0003; H04M 7/0006; H04M 7/0087
See application file for complete search history.

(56) References Cited

U.S. PATENT DOCUMENTS

| | | | |
|---|---|---|---|
| 2005/0286711 A1* | 12/2005 | Lee | H04L 12/5692 |
| | | | 379/399.01 |
| 2011/0319061 A1* | 12/2011 | Schmackpfeffer | H04L 51/224 |
| | | | 455/415 |
| 2014/0279318 A1* | 9/2014 | Friedman | G06Q 30/04 |
| | | | 705/32 |

(Continued)

*Primary Examiner* — Michael Thier
*Assistant Examiner* — Prince A Mensah
(74) *Attorney, Agent, or Firm* — Crawford Maunu PLLC

(57) ABSTRACT

Certain aspects of the disclosure are directed to correlating communication data between a plurality of communication service providers, via a data communications server. According to a specific example, the data communications server receives a selection of a communications service provider to interface with the data communications server. In certain instances, an event associated with a first user of the data communications server is detected, the data communications server identifies a second user associated with the event and a type of interaction for the event. The data communications server provides instructions to the selected communications service provider to retrieve data correlated with the second user, and displays the correlated data received from the server of the communications service provider on a device accessible by the first user.

20 Claims, 9 Drawing Sheets

(56) References Cited

U.S. PATENT DOCUMENTS

2015/0379302 A1\* 12/2015 Smith ................. G06F 21/6263
726/26
2016/0373398 A1\* 12/2016 Donahoe ................ G06Q 50/10

\* cited by examiner

FIG. 6

USER INTERFACES FOR AUTOMATED CONTROL AND ACCESS TO DISPARATE DATA/MANAGEMENT SYSTEMS

OVERVIEW

Aspects of various embodiments are directed to user interfaces for automated control and access to disparate data/management systems. In the following discussion, various implementations and applications are disclosed to provide an understanding of the instant disclosure by way of non-limiting example embodiments exemplified by way of one or more data-communication servers, such as server(s) operated on behalf of data-communications service providers, which provide users access to managed databases and/or services over the high throughput mediums. Non-limiting examples of data-communications service providers include ISPs (Internet Service Providers) and various other companies which provide Internet-related services such as email and search-engine services and more specialized computer-based services such as staffing software service, information technology management service, and/or customer relationship management services.

Among many other examples is a telecommunications service company providing services which include Voice over Internet Protocol (VoIP)-type data communications. VoIP communications typically involve a VoIP-type data-communication server communicating with a VoIP-enabled endpoint device ("VoIP device") via a broadband network (Internet, Wi-Fi, cellular, satellite, etc.) to connect with such a (VoIP) server that is managed by a VoIP provider and/or an ISP. Through such a server, call routing and other data (tele-) communications services are managed for the endpoint device.

Computer servers are increasingly being used to provide various services over a network including, but not limited to, VoIP communication services such as VoIP calls, video conferencing, call exchange servers, packet switching, and traffic management as well as non-VoIP services including, but not limited to: website hosting, remote data storage, remote computing services, and virtual computing environments.

The use of VoIP telecommunications services has been widespread and significant in terms of both numbers of users and types of services being made available. This growth may be attributable to any of a wide variety of socio-economic changes such as the mobility of users of these services, the types and reduced costs of portable telecommunication tools, and the ever-evolving technology adapting to the personal and business needs of the telecommunications users.

SUMMARY

Various example embodiments are directed to issues such as those addressed above and/or others which may become apparent from the following disclosure concerning user interfaces for automated control and access to disparate data/management systems.

In an example embodiment, a data communications server provides data communications to a plurality of client entities. The data communications server correlates data communications between the data communications server and a plurality of disparate communication service providers. For instance, the data communications server receives from a first user on behalf of one of the client entities, an indication of a user selection of a communications service provider among the plurality of disparate communications service providers to interface with the data communications server. In response to detecting an event associated with the first user of the data communications server, the data communications server identifies a second user associated with the event, and selects the communications service provider corresponding to the indication. The data communications server provides instructions to the selected communications service provider to request retrieval of data correlated with the second user, and in response to the selected communications service provider replying to the request, the data communications server displays on a communications-enabled device including a processing circuit and accessible by the first user, second-user data derived from the correlated data and representative of previous communications between the first user and the second user.

As another illustration, a system is provided which includes a plurality of communication service provider servers, each respective communication service provider is configured and arranged to provide a different respective communication service to a user of a server-based system. The server-based system may include a data-communication server such as a broadband server and/or a Voice over Internet Protocol (VoIP) system which, in addition to enabling communication of data between nodes, also enables voice. The system further includes a data communications server, configured and arranged to correlate communication data between the plurality of communication service providers. The data communications server, which provides data communications to a plurality of client entities, may correlate the communication data by receiving a selection of a communications service provider among the plurality of communications service providers to interface with the communication server. The communication server may receive the selection of a communications service provider from a user on behalf of one of the client entities, such as via a user interface provided by the communication server. In response to detecting an action associated with the user of the communication server, the communication server may identify context information of the action, wherein the context information includes identification of a second user associated with the action and a type of interaction for the action. For example, the communication server may detect the placement of a call (such as a VoIP call), the receipt of a call, and/or transmission of an email message, among other actions. The communication server may further provide instructions to the selected communications service provider to retrieve data correlated with the identified context information, and display correlated data received from the server of the communications service provider on a user interface. The correlated data may include additional email, chat, and/or voice communications between the first user and the second user. Similarly, the correlated data may include sales information, technical service information, and/or other communication data relating to the second user. By correlating communication data associated with the second user, the first user may improve the customer service experience by combining and presenting previous communication data associated with the second user during the client interaction.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the drawings included in the attached Appendices and the accompanying drawings, in which:

FIG. 6 shows an example graphical user interface for automated control and access to disparate data/management systems, consistent with the present disclosure;

Figure 1:
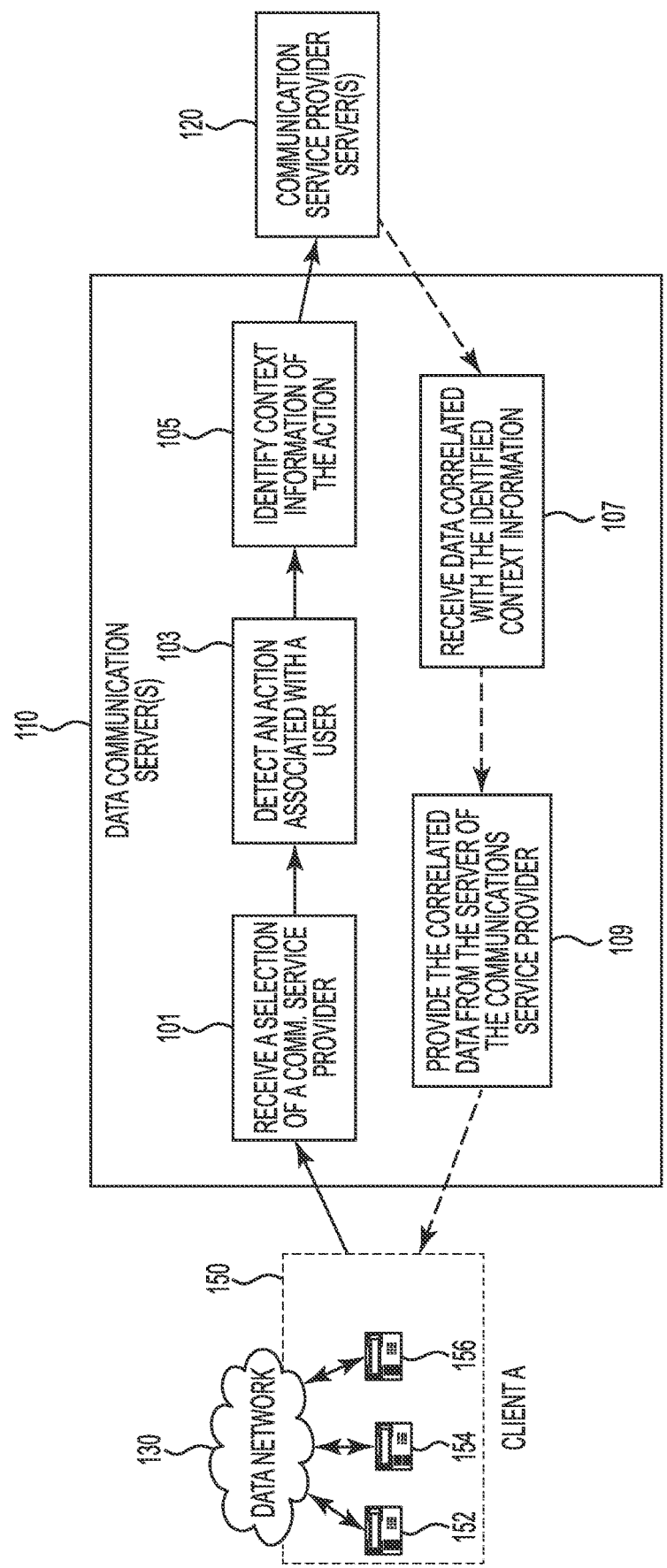
FIG. 1 shows a block diagram of an example system for automated control and access to disparate data/management systems, consistent with embodiments of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving user interfaces for automated control and access to disparate data/management systems. In certain implementations, aspects of the present disclosure have been shown to be beneficial when used in a VoIP system including a VoIP communication server and a plurality of communication service providers.

Users of a server-based system often use a plurality of communication services to communicate with clients and other professionals and to carry out various tasks. For example, users may use a private network application to generate work products, a cloud-based application to manage service issues, another cloud-based application to manage direct communications such as email and chat messages, and yet another cloud-based application to manage financial matters such as billing and invoicing. In many instances, it may be beneficial for users of the server-based system to compile a list of recent interactions with a client and/or other professional to improve subsequent interactions with the client or professional. For instance, a first user, a sales representative that uses a VoIP system, may interact with Customer A. When contacting Customer A to inquire about the status of Customer A's account and to share a promotional opportunity available, the first user may wish to have information about Customer A's recent technical calls which indicate Customer A has had technical difficulty, and the first user may wish to have readily available the most recent email communications with Customer A.

In an additional illustration, a user of such server-based system may utilize information from a plurality of data/ management systems to interact with customers. For instance, a second user, an information technology (IT) technician may use an instant messaging service to communicate with clients that are having technical problems with a software application. The second user may also use an email service such as Google Gmail or Microsoft Outlook to communicate with clients as well as colleagues. Customer B, a client of the second user, may send the second user an instant message requesting assistance with the software application. In accordance with the present disclosure, the second user may receive information regarding Customer B from additional data or management systems in response to receipt of the message from Customer B. For instance, in response to receipt of the instant message from Customer B requesting IT support, a graphical user interface may display for the second user the previous email messages between the second user and Customer B, invoices including the previous purchases made by Customer B, and service tickets including notes from previous technical support requests from Customer B. In such a manner, during the chat session with Customer B, the second user can more quickly and efficiently assess Customer B's technical needs without having to independently search multiple data or management systems during the chat session.

In a particular example embodiment, communication data is correlated between a plurality of disparate communication service providers, via a data communications server which provides data communications to a plurality of client entities. The data communications server receives from a first user on behalf of one of the client entities, an indication of a user selection of a communications service provider among the plurality of disparate communications service providers to interface with the data communications server. In response to detecting an event associated with the first user of the data communications server, the data communications server identifies a second user associated with the event, and provides instructions to the selected communications service provider to request retrieval of data correlated with the second user. In response to the selected communications service provider replying to the request, the data communications server displays on a communications-enabled device including a processing circuit and accessible by the first user, second-user data derived from the correlated data. In such embodiments, the second-user data is representative of previous communications between the first user and the second user.

Turning now to the figures, FIG. 1 shows a block diagram of a system for automated control and access to disparate data/management systems, consistent with embodiments of the present disclosure. Such correlation may be implemented using a telecommunications server, for example, operated by a service provider which provides data communications services including VoIP, Internet connectivity, multimedia such as email, video, chat, and/or unified messaging, to customers which may include business entities. As illustrated in FIG. 1, the system includes a data communications server 110 configured to provide communications for a plurality of endpoint devices 152, 154, and 156 connected in one or more data networks 130. Although FIG. 1 illustrates a single data network 130 communicatively coupled to the data communications server 110, examples are not so limited and the VoIP communication server 110 may be communicatively coupled to two or more data networks. The endpoint devices 152, 154, and 156 may include communications-enabled devices including IP phones, smart phones, tablets, and/or desktop computers with appropriate VoIP software applications, among other examples. Each endpoint device may include a user interface which is configured and arranged to receive input from a user as described herein. Moreover, each endpoint device may be associated with an account of a respective client. Endpoint devices may be associated with a particular client account by registering the endpoint device with a particular client account serviced by the data communications server. Registered devices for each client account may be listed in a respective account settings file (not shown) stored by the data communications servers 110. In this example, endpoint devices 152, 154, and 156 are associated with an account 150 for a first client A. In some examples, a plurality of endpoint devices (not illustrated in FIG. 1) may be associated with an account for a second client (e.g., client B, not illustrated in FIG. 1). In such a manner, a plurality of clients may each be serviced by the data communications server 110 in accordance with the present disclosure.

Each client communicatively coupled to the data communications server 110 may access data and/or services provided by a plurality of communication service providers. For example, client A 150 may access as non-limiting examples, an email service, a word processing service, a staffing software service, an information technology (IT) management service, and/or a customer relationship management (CRM) service. Specific examples of such email services may include services such as provided by Google Gmail, Yahoo mail, and/or Microsoft Outlook, among other example email service providers. Specific examples of such word processing services may include services such as provided by Microsoft Office, Google Docs, and/or Apple iWork, among other example word processing services. Specific examples of such staffing software services may include services such as provided by Bullhorn Inc., BambooHR, and/or Namely, Inc., among other example staffing software services. Specific examples of such IT management services may include services such as provided by Zendesk Inc., ServiceNow Inc., and/or Micro Focus, among other IT management services. Specific examples of such CRM services may include services such as provided by Salesforce Inc., Microsoft Corp., and/or NetSuite Inc., among other CRM services. Each of the respective communication services accessed by client A may be provided by a different respective server. For instance, services and/or data associated with Google are provided by a Google server, services and/or data associated with Microsoft Office are provided by a Microsoft Office server, services and/or data associated with Bullhorn are provided by a Bullhorn server, services and/or data associated with an IT management service are provided by a IT management server, and services and/or data associated with Salesforce are provided by a Salesforce server. Moreover, each of the respective communication services accessed by client A (e.g., external data communications service providers) can use remote data-communication protocols which are unique (disparate) relative to a protocol used for communicating data by the data communications server 110. The above-mentioned communication service providers are used for illustration purposes only, and additional and/or different service providers are contemplated in the examples described herein. As such, it is noted that although while FIG. 1 illustrates a single communication service provider server 120, examples of the present disclosure may include two or more communication service provider servers.

While each respective client (e.g., client A 150) may access the services provided by the respective communication service providers independent of the data communications server 110, in accordance with the present disclosure, the data communications server 110 is communicatively coupled to the respective communication service provider servers 120 to facilitate the correlation of communication data in a data communication system. For example, the data communications server 110 may receive via a user interface of a computing device (e.g., one of endpoint devices 152, 154, and 156), a selection of a communications service provider among the plurality of communications service providers to interface with the data communications server 110. For instance, a user of endpoint device 152 may select services provided by Google to interface with the data communications server 110. At 101, the data communications server 110 may receive the selection of the communications service provider from the user. Responsive to the selection of the communications service provider, the data communications server 110 may provide the user with a graphical user interface for entering log in credentials for the services provided by the data communications server 110. Additionally, the user may enter on the user interface of the endpoint device, log in credentials associated with the services provided by the communication service provider. In such a manner, the user can access services and/or data associated with both the data communications server 110 as well as services and/or data associated with the communication service provider server 120. As discussed more thoroughly herein, the user may enter log in credentials for a plurality of communication service provider servers, such that the user may access the services and/or data of a plurality of communication service providers via the data communications server 110.

Once log in credentials have been provided for the selected communication service provider(s), the data communications server 110 may detect via the user interface provided by the data communications server 110, an action associated with the user at 103. For example, the user may place a VoIP call, access an email, and/or access a calendar appointment using the user interface provided by the data communications server 110. While the example provided refers to actions that are initiated by a user, examples of the present disclosure include detecting actions that are not initiated by the user, such as detecting an incoming call and/or detecting an incoming message, among other examples. Responsive to the data communications server 110 detecting an action associated with the user, the data communications server 110 may identify context information of the action at 105. The context information includes identification of at least one other user associated with the action and a type of interaction for the action. For example, when an action is detected, the data communications server 110 can search in the system provided by the communication service provider server and map the phone or identifier used in the action to contact and/or user information for the other user associated with the action. The data communications server 110 can retrieve an email identifier, phone number, chat identifier and/or other forms of information that identify the other user associated with the action. Identification of the type of interaction may refer to or include identifying if the detected action is one of a phone call, an email communication, a chat message, receipt of a calendar appointment among other examples.

Responsive to identification of the context information, the data communications server 110 may receive from the communication service provider server 120, data correlated with the identified context information at 107. In some examples, the data communications server 110 may access the data of the communication service provider server 120 directly, and retrieve the correlated data, and in some examples the data communications server 110 may provide instructions to the communication service provider server 120 requesting retrieval of data corresponding to the identified context information. The correlated data includes previous interactions between the users associated with the action. The correlated data may vary depending on the communication service provider selected by the user, and in most applications such data is stored and retrieved by a CPU/server in a database (aka, databank, look-up memory or more generically as computer-coupled memory circuit). For example, if the user selected Google as the communication service provider to interface with the data communications server 110, then the correlated data received at 107 may include meetings, email messages and/or documents stored in the Google server. Similarly, if the user selected an IT management service as the communication service provider to interface with the data communications server 110, then the correlated data received at 107 may include IT incidents. As another illustration, if the user selected a billing system as the communication service provider to interface with the data communications server 110, then the correlated data received at 107 may include invoices. At 109, the data communications server 110 can provide via the user interface, the correlated data received from the server of the communication service provider server 120.

In some examples, the data communications server 110 is configured and arranged to provide instructions to the selected communications service provider to retrieve data correlated with the identified context information within a threshold period of time. For instance, the data communications server 110 may instruct the communication service provider server 120 to retrieve all historical data associated with the users (e.g., the user of the data communications server and the other user to which the communication is directed), or to retrieve historical data associated with the users within the last 12 months.

In some examples, the data communications server is configured and arranged to display the correlated data on the user interface and in an order based at least in part on an identification of the first user. For example, if the detected action is a VoIP phone call placed by a user of client A 150, and the user is in a sales position, then the data communications server may display the correlated data from the communication service provider server(s) 120 with sales information listed first in priority, and technical information listed subsequently in the display. As another illustration, if the user of client A 150 works in a technical position, then the data communications server may display the correlated data from the communication service provider server(s) 120 with technical information listed first in priority, and sales information listed subsequently in the display. In some examples, the order in which the correlated data is displayed on the user interface may be based on the content and relative importance of the correlated data. For instance, a service incident report from an IT management service which indicates that the particular user had a significant technical problem may be displayed first in the display relative to email correspondence from Google, or sales information from Salesforce, as the service incident may impact all future correspondence with that particular user. In some examples, each respective client of the data communications server 110 may specify a manner in which correlated data is displayed for respective users. For example, client A 150 may specify that the correlated data is displayed with sales information always listed first, or that recent email or chat communications are always listed first.

In some examples, the data communications server 110 may customize the order of display of correlated data based on previous interactions with a particular user. For instance, a user of client A 150 (e.g., a "first" user) may use the data communications server 110 to communicate with another user (e.g., a "second" user), such as a client and/or other professionals. The first user may contact the second user by email using the data communications server 110 and retrieve correlated data about the second user via the communication service provider server 120. The data communications server 110 may display the correlated data about the second user to the first user, and the first user may provide feedback, such as on the user interface provided by the data communications server 110, regarding the order of the correlated data. The first user may adjust the order of the displayed information or provide direct feedback on the helpfulness of the correlated data. Based on the feedback received from the first user, the data communications server 110 may customize the order in which correlated data is presented to the first user in subsequent transactions. In such a manner, the data communications server 110 can intelligently customize the presentation of correlated data to each user of client A and improve the value of the information presented.

As an illustration, a first user may be a user of the data communications server 110. The first user may access a user interface provided by the data communications server 110 on an endpoint device 154. The first user can log into an account provided by the data communications server 110 by entering log in credentials on the user interface. The first user can also, via the user interface, select one or a plurality of communication service providers to interface with the data communications server 110. As an illustration, the first user can select both Google and Salesforce as communication service providers to interface with the data communications server 110. Responsive to the first user's selection of Google and Salesforce as the communication service providers to interface with the data communications server 110, the first user may be presented with a graphical user interface to enter log in credentials for each of Google and Salesforce. Once appropriate log in credentials are provided for each of the data communications server and the communication service provider servers, the integrated system may wait to detect an action. A first user can initiate a VoIP phone call via the user interface of his endpoint device 154, as provided by the data communications server 110. The data communications server detects the first user's phone call, identifies the action as a phone call, and retrieves the phone number of the VoIP call (e.g., 867-5309). The data communications server then identifies the phone number 867-5309 as being associated with a second user. Responsive to identifying the action as a phone call placed to the second user, with the phone number 867-5309 (this information collectively referred to as the context information), the data communications server 110 communicates the context information to the Google and Salesforce servers with a request to retrieve additional information pertaining to the second user and the phone number 867-5309. In turn, the Google and Salesforce servers return to the data communications server 110, any data associated with the second user and/or the phone number 867-5309. For example, the Google server may provide to the VoIP server, a list of emails placed between the first user and the second user, and the Salesforce server may provide to the data communications server, a list of purchases made by the second user and/or another user associated with the phone number 867-5309. This additional (e.g., correlated) data may be provided to the first user while the first user is placing the call to the second user, such that the first user has correlated data about previous interactions with the second user and/or the phone number 867-5309, thereby improving the interaction between the first and second users. The data communications server 110 may provide the correlated data to the first user via the user interface of his endpoint device 154.

As described herein, the data communications server 110 may interface with a plurality of communication service providers to correlate communication data in the data communications system. Accordingly, the data communications server is configured and arranged to receive from a user, a selection of a first communications service provider as well as a second communications service provider to interface with the data communications server. Once communication is established between the data communications server and the servers of the selected communication service providers, the data communications server may receive from the servers of the selected communication service providers, data correlated with the identified context information. The correlated data may be provided to the user via a user interface. In some examples, the data communications server 110 is configured and arranged to provide via the user interface, a plurality of selectable data communications services based on the correlated data received from the servers of the first communications service providers. For example, the first user may be presented with selectable options to send the second user a chat message, an email, a meeting appointment, and/or to call the second user using the data communications server 110.

In various example embodiments, the data communications server 110 provides via a graphical user interface on a device accessible by the first user, at least one recommendation for interacting with the second user, based at least in part on the correlated data. For instance, the data communications server 110 can provide a recommendation to the first user, a list of services or products which may be of interest to the second user, based on information technology (IT) incidents correlated with the second user, invoices correlated with the second user, or content included in email messages or documents correlated with the second user. As an additional illustration, the data communications server 110 can provide a list of topics that are positively associated with the second user (e.g., have historically resulted in an overall positive interaction) and a list of topics that are negatively associated with the second user (e.g., have historically resulted in an overall negative interaction). Moreover, the data communications server 110 can provide a recommendation on a format or medium for communicating with the second user. For instance, the second user may prefer text messaging as a method of communication as opposed to phone calls. Moreover, the second user may prefer voice calls regarding sensitive topics such as billing inquiries as opposed to email communications or written letters.

Figure 2:
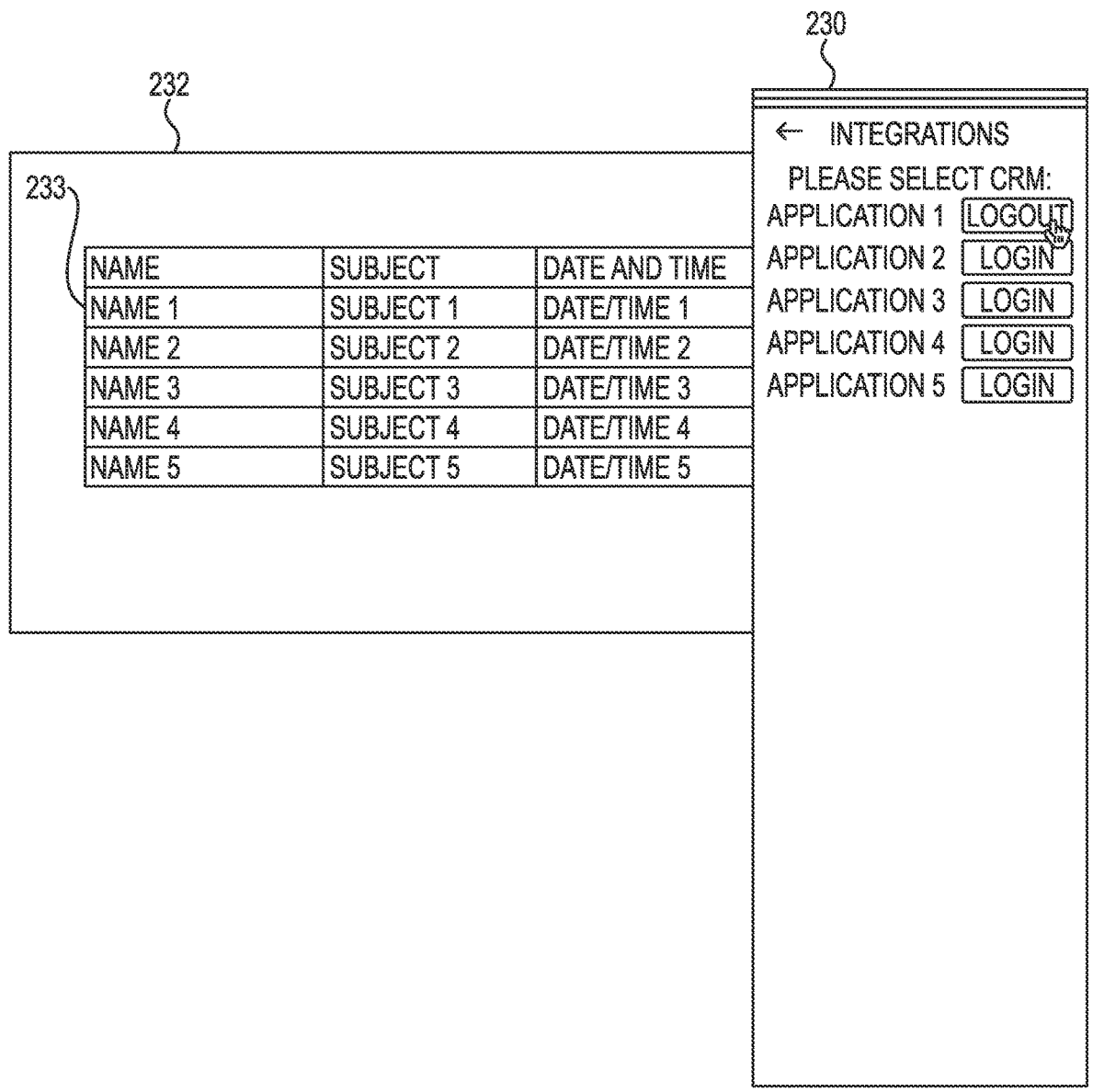
FIG. 2 shows an example graphical user interface including a selection of selectable communication service providers for automated control and access to disparate data/ management systems, consistent with embodiments of the present disclosure.

FIG. 2 shows an example graphical user interface including a selection of selectable communication service providers for automated control and access to disparate data/management systems, consistent with embodiments of the present disclosure. As illustrated in FIG. 2, the user may be provided with a list 230 of available communication service providers from which to select. Each of the communication service providers may be associated with a different respective communication service provider server, as described with regard to FIG. 1. Responsive to selection of the "login" button for the corresponding communication service provider, the user may be provided with fields to enter login credentials for accessing the corresponding communication service provider. For example, the user may be provided with fields to enter login credentials for Office 365, or an IT management service, etc. The selected communication service provider will interface with the VoIP communication server as described in FIG. 1.

The user may access multiple communication services at a time, while also accessing the services provided by the data communications server. As illustrated in FIG. 2, the user may access an email account, and review a list of emails in a graphical user interface 232. Selection of one of the emails in the graphical user interface 232 may prompt the retrieval of information from at least one of the integrated communication services selected in window 230. For example, if the user were to select the Login button next to the IT management service button, then select the email 233 corresponding to "name 1," "subject 1," and "date/time 1," then data corresponding with "name 1" may be retrieved from the IT management service server and provided to the user.

Figure 3:
FIG. 3 shows an example graphical user interface for automated control and access to disparate data/management systems, consistent with embodiments of the present disclosure.

As an illustration, FIG. 3 shows an example graphical user interface for automated control and access to disparate data/management systems, consistent with embodiments of the present disclosure. Referring to FIG. 2, responsive to selection of a particular email in the graphical user interface 232, correlated data may be provided to the user from the selected communication service provider. For instance, responsive to selection of the email to the user in the graphical user interface 341, the data communications server may return a pop-up window 340 displaying information retrieved from the selected communication service provider. The popup window 340 includes correlated data about the user, including the user's availability on Google chat, the user's email address, the user's VoIP phone address, a URL associated with the user, and information about a previous meeting including the user.

Figure 4:
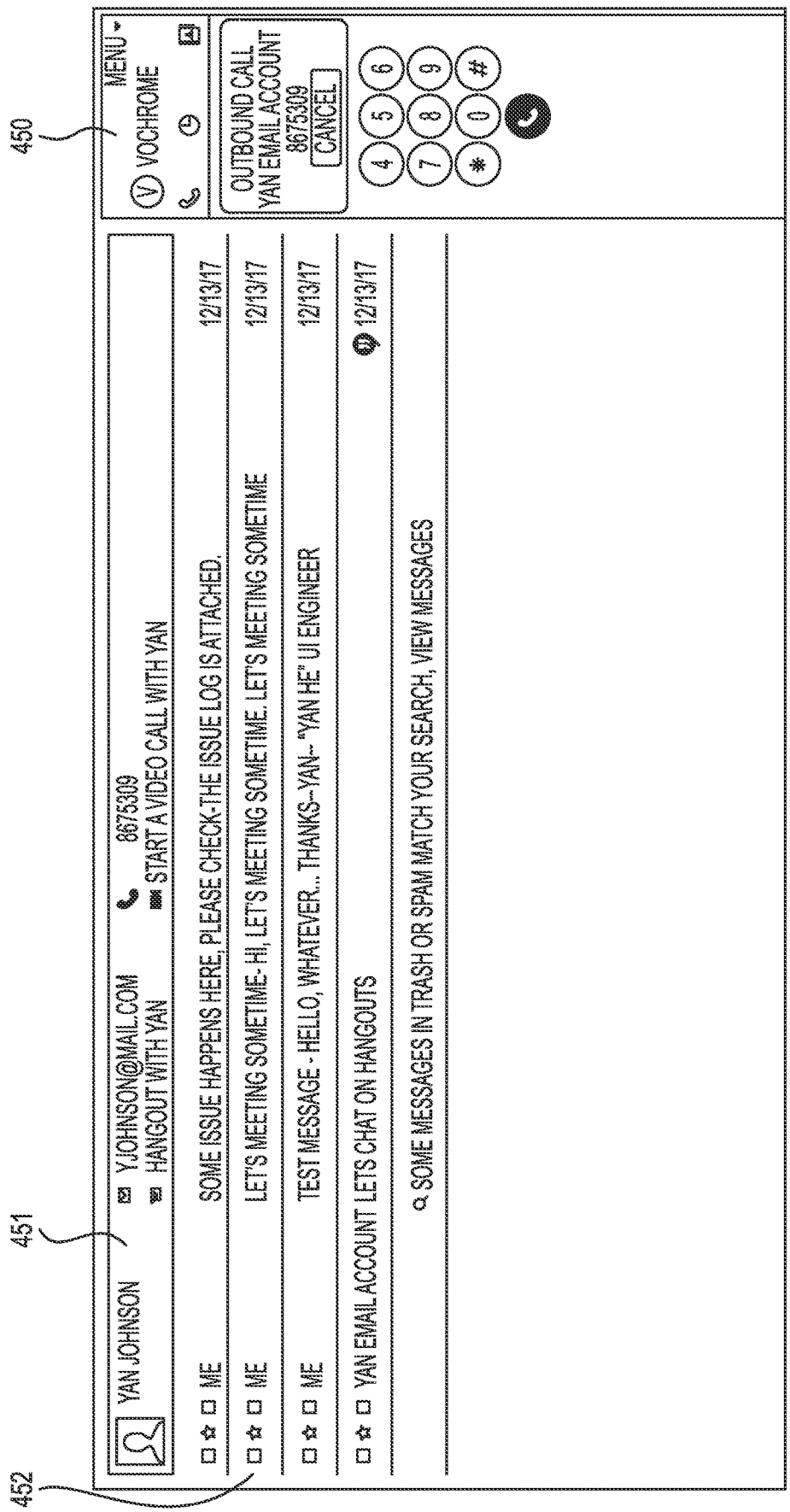
FIG. 4 shows an example graphical user interface for automated control and access to disparate data/management systems, consistent with the present disclosure.

FIG. 4 shows an example graphical user interface for automated control and access to disparate data/management systems, consistent with the present disclosure. When an action is detected by the data communications server (e.g., 110 illustrated in FIG. 1), the data communications server responds by producing a context of the detected action, searches the relevant communication service provider, and responds to the event by displaying the retrieved information. For example, referring to FIG. 4, the user may place a VoIP call using the using interface 450. The VoIP call is detected, the number associated with the VoIP call (8675309) is identified, and the context information for the action is displayed in window 451. In this example, window 451 provides the name, email address, and phone number for the user, as well as selectable options to initiate a chat session and/or a video call with the user. Additionally, previous communications with the user (in this example, Yan Johnson) are displayed in window 452. That is, responsive to dialing the number 8675309 on the user interface provided by the VoIP communication server, the context information associated with the dialed number is displayed (including the identity of the user dialed), and previous email communications associated with the dialed user are also displayed.

Figure 5:
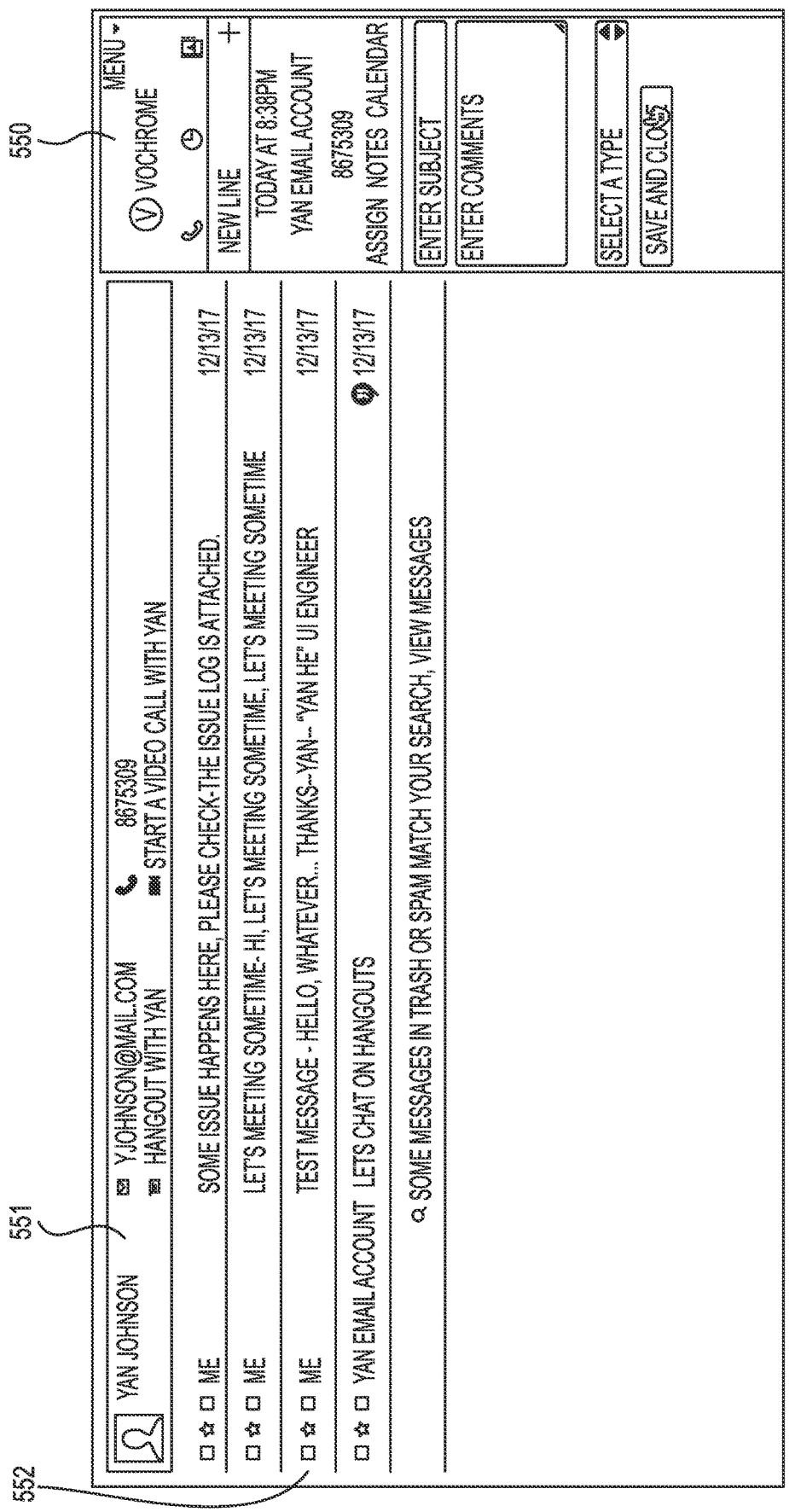
FIG. 5 shows an example graphical user interface for automated control and access to disparate data/management systems, consistent with the present disclosure.

FIG. 5 shows an example graphical user interface for automated control and access to disparate data/management systems, consistent with the present disclosure. Like the example described with regards to FIG. 4, the data communications server responds to the dialed VoIP call by producing a context of the detected action in window 551, searches the relevant communication service provider, and responds to the event by displaying the retrieved information in window 552. In the example illustrated in FIG. 5, additional notes and/or comments associated with the interaction with Yan Johnson may be entered in the comments box of window 550. The notes and/or comments entered in window 550 may be saved for later retrieval, such that the content of the conversation with Yan Johnson may be memorialized.

Figure 6:
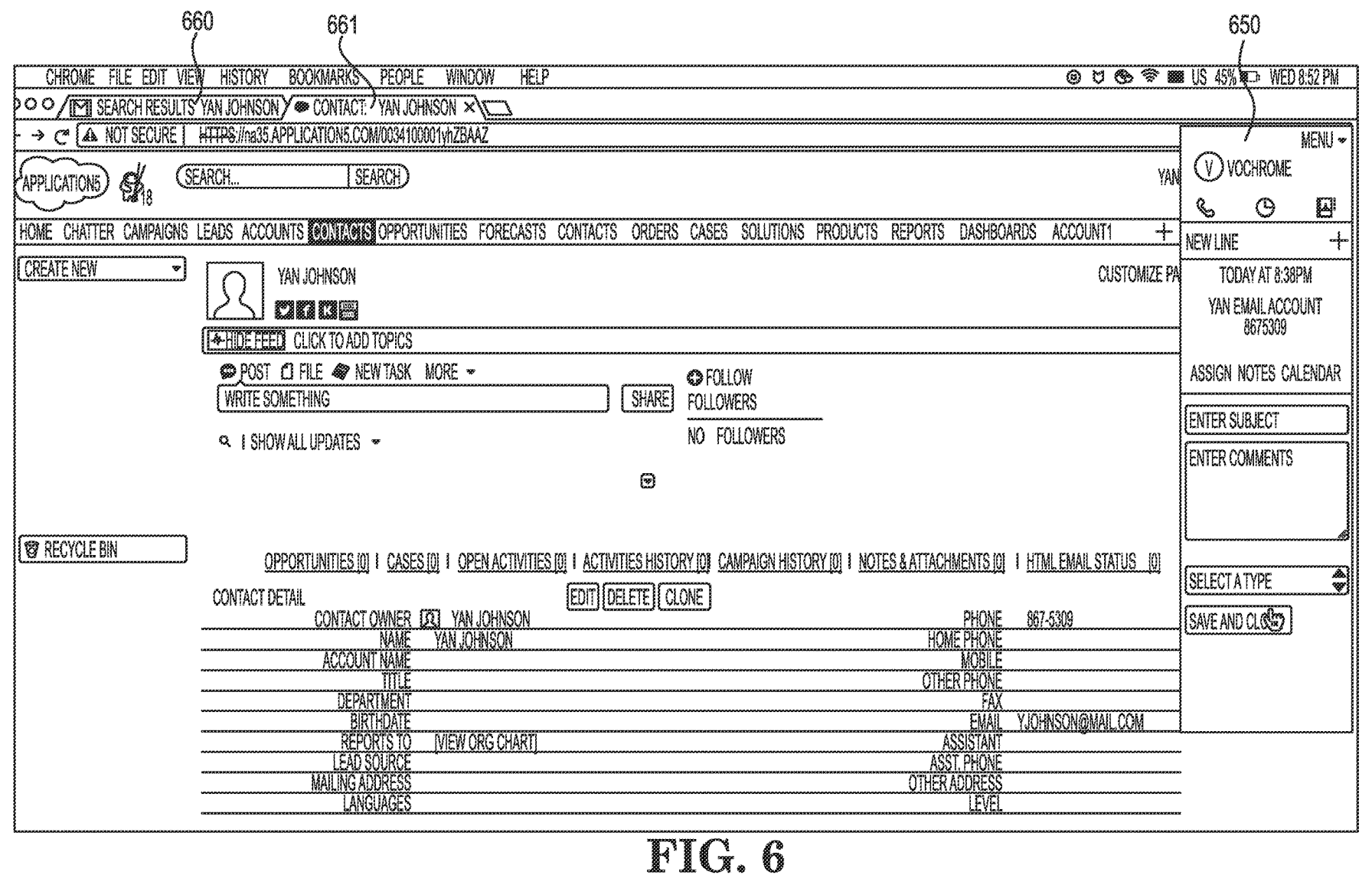

FIG. 6 shows an example graphical user interface for automated control and access to disparate data/management systems, consistent with the present disclosure. In some examples, when an action is detected, the data communications server (e.g., 110 illustrated in FIG. 1) may search in multiple communication service providers and retrieve multiple sets of correlated data associated with the relevant parties. This correlated data may be displayed in an application provided by the data communications server. For instance, referring to FIG. 3, the correlated data from the Google server search is displayed in the window 340, which is provided by the VoIP communication server. Additionally, and/or alternatively, the correlated data may be displayed in applications provided by each respective communication service provider, as illustrated in FIG. 6. For example, for illustration, assume that the user was to select Google, an IT management service, and Salesforce as communication service providers to integrate with the data communications server. In this example, responsive to detection of a VoIP call, the correlated data may be retrieved as described herein. The Google application can display all content relevant to the Google application (e.g., emails, chat messages, documents, and/or meetings), the Salesforce application can display all content relevant to the Salesforce application (e.g., the account with all the sales associated with the user), and the IT management application can display all content relevant to the IT management application (e.g., the IT incidents associated with that user).

Referring again to FIG. 6, responsive to the user dialing the phone number 867-5309 in window 650, the identity of the called user is identified (in this example, Yan Johnson) based on the dialed number, and both the Google server and the Salesforce server are searched for communications between the user that dialed the number and Yan Johnson. An application window 660 for the Google application may be provided, as well as an application window 661 for the Salesforce application. Responsive to identification of the context information (e.g., identification of Yan Johnson as the dialed user), the application window 660 for the Google application may display emails exchanged between the dialing user and Yan Johnson (the dialed user), and the application window 661 for the Salesforce application may display sales information associated with Yan Johnson.

In some examples, the data communications server can interface with cloud-based communication services, as well as private network-based communication services. For example, referring to FIG. 1, endpoint devices 152, 154, and 156 may access additional network applications, such as those provided by data network 130. Examples of such network applications may include a private client management application which is only accessible to users of client A. In this example, if a private network application accessible by the user of client A is opened, then the data communications server 110 may also prompt the private network application to retrieve all relevant content associated with the identified user and display the same. In the example illustrated in FIG. 6, the data communications server would prompt the private network application to retrieve all content related to Yan Johnson, while also prompting the Google server and the Salesforce server to retrieve content related to Yan Johnson.

Figure 7:
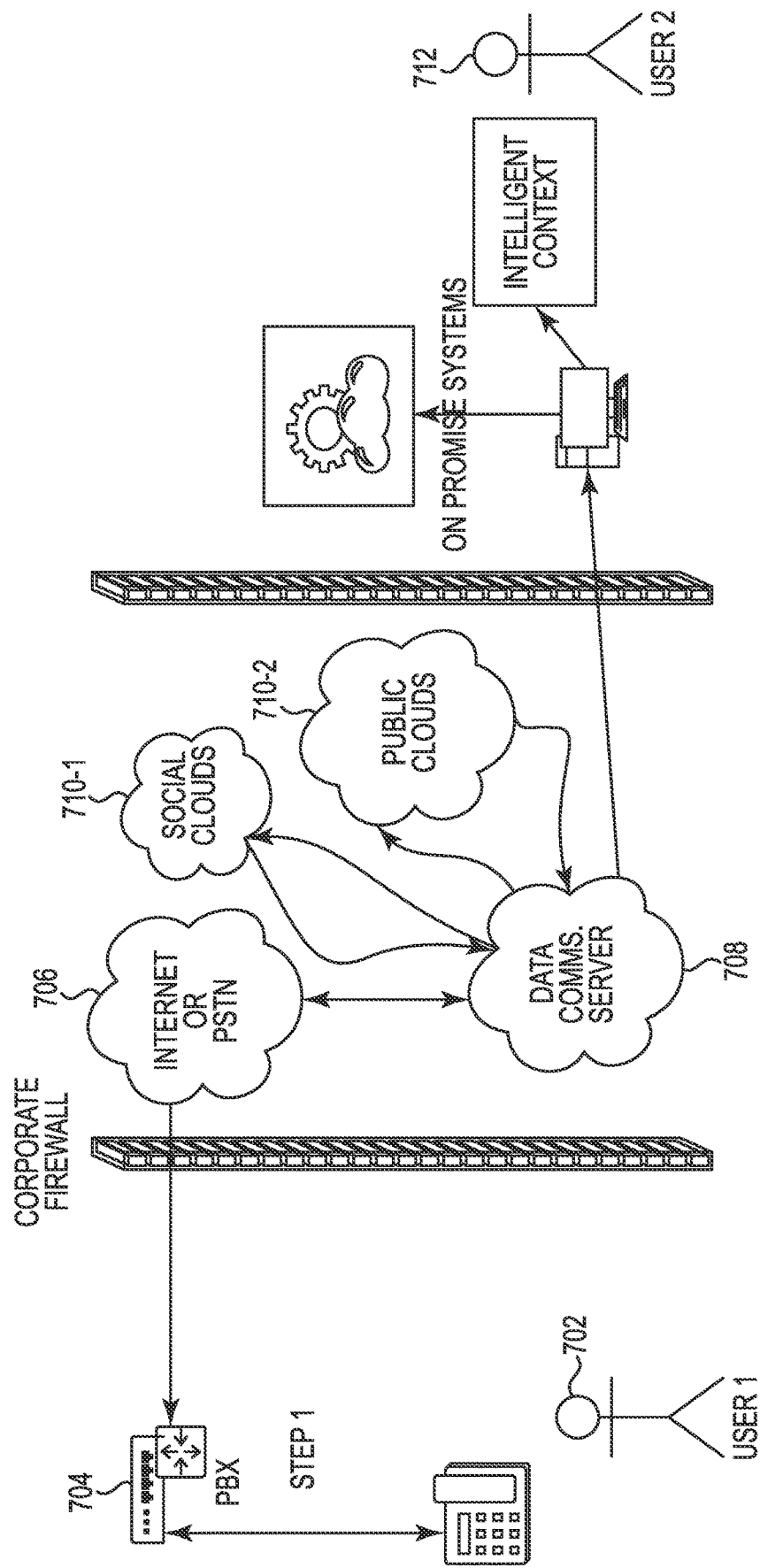
FIG. 7 shows an example flowchart for automated control and access to disparate data/management systems responsive to an incoming call, consistent with the present disclosure.

FIG. 7 shows an example flowchart for automated control and access to disparate data/management systems responsive to an incoming call, consistent with the present disclosure. In the illustrated example, at step 1, a first user 702 calls a medical facility about a throat infection. The first user 702 may place a call using a private branch exchange (PBX) server 704. The PBX server 704 connects with a data communications server 708, via the internet or a public switched telephone network (PSTN) 706. The data communications server 708 uses the phone number from which the first user 702 dialed to locate the first user's details in each of the communication services accessed by the data communications server. For instance, the data communications server 708 uses the first user's phone number to locate information about the first user from social clouds 710-1 and public clouds 710-2. The data communications server 708 then utilizes machine learning to filter and sort the data collected from the various communication services using various parameters. In such examples, an algorithm may be optimized using parameters set by the medical facility to improve interactions with patients. In the medical facility example, the algorithm may take into consideration parameters such as zip codes; family medical history; location of all patients calling in and resulting outcomes; blood pressure; blood group, blood test information; DNA information; information on previous hospital visits; as well as information on operation dates, types, and/or severity, or other information about an operation entered by a hospital. The algorithm may also take into consideration parameters such as the date of blood tests and/or imaging procedures; names of doctors and/or surgeons; race, ethnicity, and/or gender of a patient; height, weight, age, and/or body mass index (BMI) of a patient; data regarding smoking and/or alcohol use of the patient; data regarding current and/or past medication; as well as current and/or past medical diagnoses.

The data communications server 708 can present an employee of the medical facility (a second user 712 in the example illustrated in FIG. 7) with relevant data from all of the first user's 702 interactions with the medical facility as well as information from the various communication services. For example, the data communications server 708, implementing machine learning, can detect an increase in reported cases of throat infections in a user's zip code. The data communications server can communicate this data to a second user, such as via a graphical user interface. The second user can immediately see that there is a high probability that the first user is calling about a throat infection, which allows the second user to provide improved patient services to the first user.

Figure 8:
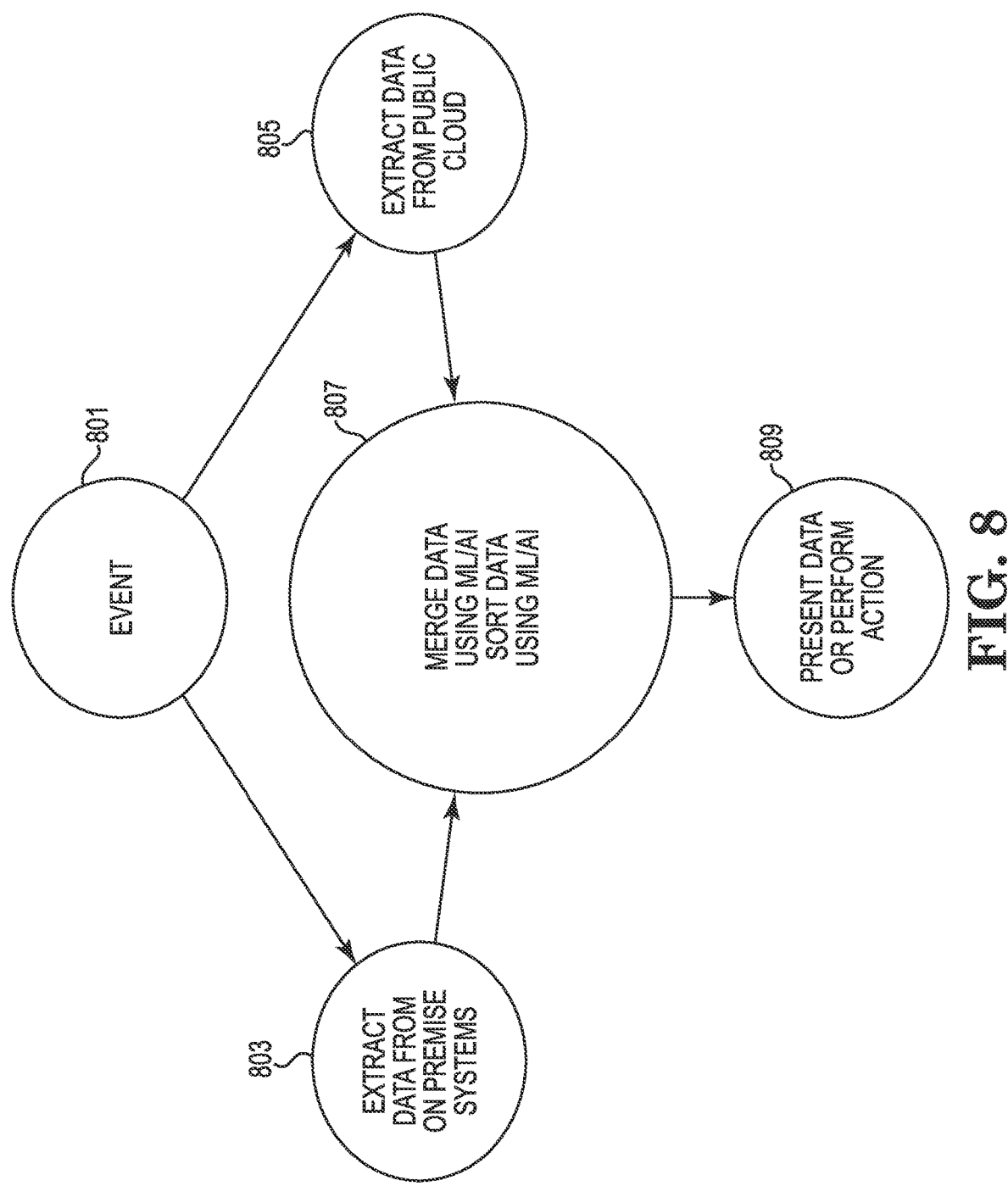
FIG. 8 shows an example flowchart for automated control and access to disparate data/management systems responsive to an incoming call, consistent with the present disclosure.

FIG. 8 shows an example flowchart for automated control and access to disparate data/management systems responsive to an incoming call, consistent with the present disclosure. In the example illustrated in FIG. 8, a medical facility may utilize services provided by the data communications server to communicate with patients. The data communications server can detect an event 801, such as a call from a patient, who reports having chest pains. The data communications server can use the phone number from the patient's call to extract the patient's details from on premise systems (systems operated by the medical facility) 803 and to extract the patient's details from public cloud systems 805. The data communication system can merge the data from the on premise systems and the data from the public cloud, and sort the merged data using machine learning and/or artificial intelligence 807. For instance, the data communications system can identify that the patient had a recent operation, and rank the merged data accordingly, based on configuration parameters set by the medical facility. The data communications system subsequently presents the data regarding the patient's recent operation to a receptionist 809 and provides an option to immediately route the call from the patient to a cardiac specialist who can also see the patient's medical history immediately. Any open pages on the cardiac specialist's computing device would then change to display the merged data regarding the patient, such that the cardiac specialist (and/or a receptionist, as the case may be) can quickly and efficiently communicate with the patient regarding chest pain, while also having readily available information from both on premise systems and public cloud systems.

Figure 9:
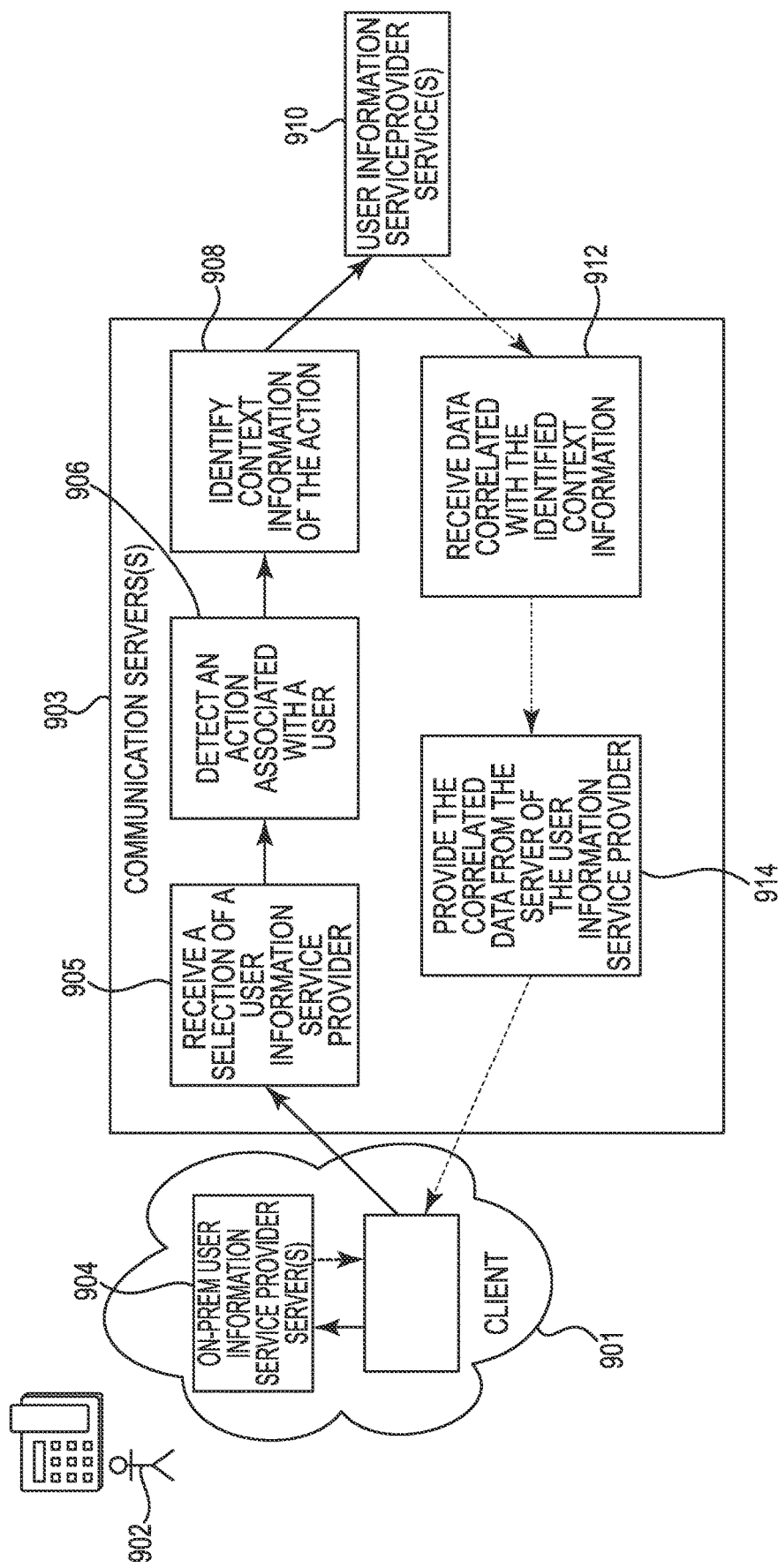
FIG. 9 shows an example flowchart for automated control and access to disparate data/management systems responsive to an incoming call, consistent with the present disclosure.

FIG. 9 shows an example flowchart for automated control and access to disparate data/management systems responsive to an incoming call, consistent with the present disclosure. In the example illustrated in FIG. 9, a first user 902 works for a client 901 of the data communication system, such as a medical facility. The first user 902 may select information service providers 904 to interface with the data communication system, such as a medical records service provider. The data communications server 903 receives a selection of the user information service provider at 905. Subsequently, a patient may call the first user 902 because the patient is having chest pains. The data communication system detects the action at 906, in this example the incoming call from the patient, and the data communication system identifies the context information of the call 908. In this example, the context information includes the phone number from which the patient has placed the call. Responsive to identifying the patient's phone number, the data communication system retrieves information associated with (e.g., correlated with) the patient and/or the patient's phone number from the user information service provider (e.g., the medical records service, in this example) 910. The medical records service provider communicates data associated with the patient to the data communications server, indicating that the patient had a recent cardiac operation, at 912. In response, the data communications server can provide correlated data from the server of the user information service provider, at 914. For instance, the data communications server can dynamically generate an interactive voice recognition (IVR) menu that asks the patient if the call is related to the operation. The IVR can gather information from the patient and instead of sending the call to the first user, the data communications server can route the call directly to a cardiac specialist (as in the above example), who is also presented with a graphical user interface displaying the patient's recent medical history along with answers to the questions presented by the IVR. Any open systems used by the cardiac specialist (such as email system, CRM system, and/or medical records system) would switch to display information pertinent to the patient.

In some examples, the data communication system can intelligently route incoming calls based on the context information and historical data from previous communications. For instance, a patient can call the medical facility as described with regards to FIG. 9 (e.g., when experiencing chest pains). The data communication system can use the phone number from the patient's call to locate the patient's details in communication systems both on premise (e.g., operated by the medical facility) and in communication systems off premise (e.g., public cloud systems). As described with regards to FIG. 9, the data communications system may identify that the patient previously had a cardiac operation and may generate an IVR system particular to the patient's previous operation. The data communications system may also identify that patients of this type (e.g., calls related to this type of cardiac operation) should be routed to a particular group of phone numbers (e.g., cardiac specialists such as in the previous example). In such a manner, the amount of time from receipt of the patient's call to connecting the patient with a cardiac specialist is reduced. Moreover, any communications systems available to the cardiac specialist with which the patient is connected can display information relevant to the patient, such as notes from medical records, notes regarding previous phone interactions, and/or email communications with the patient, among other examples. Thereby, the patient has an improved experience with the medical facility because the voice recognition system is dynamically adjusted based on information relevant to the patient, and the patient's call is automatically routed to a particular group of numbers and/or to a particular individual based on machine learning. Similarly, the medical facility has an improved experience with the patient because the issues pertinent to the patient's call are quickly identified and displayed to users on a graphical user interface, allowing the users to have immediate access to information from multiple systems simultaneously and responsive to the patient's call.

Various embodiments are implemented in accordance with the underlying Provisional Application (Ser. No. 62/634,538), entitled "User Interfaces For Automated Control And Access to Disparate Data/Management Systems," filed Feb. 23, 2018, to which benefit is claimed and which are fully incorporated herein by reference. For instance, embodiments herein and/or in the provisional application may be combined in varying degrees (including wholly). Reference may also be made to the teachings and underlying references provided in the underlying provisional application. Embodiments discussed therein are not intended, in any way, to be limiting to the overall technical disclosure, or to any part of the claimed invention unless specifically noted.

Various blocks, modules or other circuits may be implemented to carry out one or more of the operations and activities described herein and/or shown in the figures. As examples, the Specification describes and/or illustrates aspects useful for implementing the claimed invention by way of various circuits or circuitry using terms such as blocks, modules, device, system, unit, controller, and the like. In these contexts, a "block" (also sometimes "logic circuitry" or "module") is a circuit that carries out one or more of these or related operations/activities (e.g., a call control circuit). For example, in certain ones of the above-discussed embodiments, one or more modules are discrete logic circuits, computer processing circuits, or programmable logic circuits configured and arranged for implementing these operations/activities, as in the blocks shown in the figures.

Similarly, it will be apparent that a server includes a computer processing circuit that is configured to provide services to other circuit-based devices. Moreover, various other circuit-related terminology is used in a similar context as apparent to the skilled artisan, as is the case with each such apparatus which refers to or includes otherwise known circuit-based structures. As a first example, a (data communications) endpoint device (or endpoint) refers to or includes a communications circuit such as one enabled to communicate over a broadband network such as the Internet or a cellular communications network (e.g., computer) processing circuits as configured to establish data communications sessions with other endpoint devices and such endpoints include, e.g., personal computers, IP-enabled mobile phones, and tablet computers. Also, a client entity (aka "client station") refers to or includes an endpoint device (as above) which is linked/associated with a client of a provider/operator of the company overseeing the data-communications server or data-center communications server. Further, a data-center communications server or data-communications server refers to or includes a computer processing circuit that is configured to provide data-communications services to other circuit-based devices. In certain embodiments, such a processing circuit is one or more computer processing circuits programmed to execute a set (or sets) of instructions (and/or configuration data). The instructions (and/or configuration data) can be in the form of software stored in and accessible from a memory circuit, and where such circuits are directly associated with one or more algorithms (or processes). Activities pertaining to such algorithms are not necessarily limited to the specific flows such as shown in the flow charts illustrated in the figures (e.g., where a circuit is programmed to perform the related steps, functions, operations, activities, etc., the flow charts are merely specific detailed examples). The skilled artisan would also appreciate that different (e.g., first and second) modules can include a combination of a central processing unit (CPU) hardware-based circuitry and a set of computer-executable instructions, in which the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon, instructions which may be executed by a computer (or other electronic device) that includes a computer processor circuit to perform these operations/activities. For example, these instructions reflect activities or data flows as may be exemplified in figures, flow charts, and the detailed description.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the disclosure, including aspects set forth in the claims.

What is claimed is:

1. In a system having a plurality of communication service provider servers, each respective communication service provider server to provide a different respective communication service, a data communications server comprising:
    data communications circuitry to provide data communications to a plurality of client entities and to correlate communication data between the plurality of communication service provider servers by:
        responding to receipt of a selection of a particular communication service provider server from among the plurality of communication service provider servers to interface with the data communications server and to detect an action associated with a first user of one of the client entities, and then
        identifying context information of the action, wherein the context information includes identification of a second user associated with the action and a type of interaction for the action,
        providing instructions to the selected communication service provider server to retrieve data correlated with the identified context information, and
        displaying the correlated data received from the selected communication service provider server.

2. The system of claim 1, wherein the selected communication service provider server is to retrieve data correlated with the identified context information within a threshold period of time.

3. The system of claim 1, wherein the correlated data includes historical interactions between the first user and the second user within a threshold period of time.

4. The system of claim 1, wherein the correlated data is to be displayed in an order based at least in part on an identification of the first user.

5. The system of claim 1, wherein the correlated data is to be displayed in an application provided by the selected communication service provider server and displayed on the user interface.

6. The system of claim 1, wherein the selected communication service provider server is to display the correlated data on the user interface.

7. The system of claim 1, wherein the selected communication service provider server is a cloud-based communications service provider server.

8. A method for use in a system having a plurality of communication service provider servers, each respective communication service provider server to provide a different respective communication service, the method comprising:
    via data communications circuitry and a protocol, providing data communications to a plurality of client entities and correlating communication data between the plurality of communication service provider servers; and
    wherein the protocol includes
        responding to receipt of a selection of a particular communication service provider server among the plurality of communication service provider servers to interface with a data communications server and to detect an action associated with a first user of one of the client entities, and then
        identifying context information of the action, wherein the context information includes identification of a second user associated with the action and a type of interaction for the action,
        providing instructions to the selected communication service provider server to retrieve data correlated with the identified context information, and displaying the correlated data received from the selected communication service provider server on a user interface.

9. The method of claim 8, further including detecting an event associated with the data communications server and in response to the event being detected, a second user associated with the event is detected and at least one recommendation for interacting with the second user, based at least in part on the correlated data, is generated.

10. The method of claim 8, further including providing a recommendation to the first user, a list of services or products which may be of interest to the second user, based on information technology (IT) incidents correlated with the second user, invoices correlated with the second user, or content included in email messages or documents correlated with the second user.

11. The method of claim 8, further including correlating communication data between the plurality of communication service provider servers by:
accessing the data of the selected communication service provider server; and
retrieving from the selected communication service provider server, previous interactions between the first user and the second user.

12. The method of claim 8, further including correlating communication data between the plurality of communication service provider servers by mapping an identifier used to contact the second user to additional user information correlated with the second user.

13. The method of claim 12, further including retrieving an email identifier, phone number, or chat identifier correlated with the second user based on the mapping.

14. The method of claim 8, wherein the selected communication service provider server is to provide an email service, the method further including retrieving meetings, email messages or stored documents associated with the first and second users.

15. The method of claim 8, including receiving a selection of an information technology (IT) management service and a billing system as the selected communication service provider server, the method including retrieving previously documented IT incidents associated with the second user and retrieving previously documented invoices associated with the second user.

16. A computer-implemented method comprising:
responding to a selection of a particular communication service provider server, from among a plurality of communication service provider servers, to interface with a data communications server and further responding to detection of an action associated with a first user of one of a plurality of client entities that are to receive data communications services from the plurality of communication service provider servers, and then
identifying context information of the action, wherein the context information includes identification of a second user associated with the action and a type of interaction for the action,
providing instructions to the selected communication service provider server to retrieve data correlated with the identified context information, and
displaying correlated data received from the selected communication service provider server on a user interface.

17. The method of claim 16, further including retrieving previously documented incident reports associated with the second user.

18. The method of claim 16, further including retrieving previously documented invoices associated with the second user.

19. The method of claim 16, further including retrieving documentation, associated with the second user, including a set of one or more previously documented incident reports and further including a set of one or more invoices.

20. The method of claim 16, further including correlating communication data between the plurality of communication service provider servers by a process that includes accessing from the selected communication service provider server, the communication data, and previous interactions involving at least one of the first user and the second user, wherein said previous interactions include previous interactions between the first user and the second user.

* * * * *